(12) United States Patent
Kwon et al.

(10) Patent No.: US 11,226,703 B2
(45) Date of Patent: Jan. 18, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Do Hyoung Kwon, Gyeonggi-do (KR); Ji Yeon Kim, Gyeonggi-do (KR); Ki Deok Lee, Gyeonggi-do (KR); Cheol Hun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/128,451

(22) Filed: Dec. 21, 2020

(65) Prior Publication Data

US 2021/0191594 A1    Jun. 24, 2021

(30) Foreign Application Priority Data

Dec. 24, 2019 (KR) .......................... 10-2019-0173839

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC .............................. G06F 3/0446; G06F 3/0412
See application file for complete search history.

(56) References Cited

U.S. PATENT DOCUMENTS

2015/0363024 A1* 12/2015 Hayashi ................ G06F 3/0446
345/174
2018/0350885 A1* 12/2018 Choi ..................... G06F 3/0412

FOREIGN PATENT DOCUMENTS

WO    WO 2013/063176 A1    5/2013

\* cited by examiner

*Primary Examiner* — Peter D McLoone
(74) *Attorney, Agent, or Firm* — The PL Law Group, PLLC

(57) ABSTRACT

A touch sensor according to an embodiment of the present invention includes a base layer, a first electrode layer including first dummy electrodes and first sensing electrodes including first holes therein arranged on a top surface of the base layer, the first sensing electrodes, an insulating interlayer formed on the base layer and covering the first electrode layer, and a second electrode layer including second dummy electrodes and second sensing electrodes including second holes therein arranged on a top surface of the insulating interlayer. An electrode visual recognition can be suppressed by an overlapping arrangement of the holes and the electrode patterns.

14 Claims, 9 Drawing Sheets

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Applications No. 10-2019-0173839 filed on Dec. 24, 2019 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a plurality of sensing electrode layers and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

In the touch sensor, sensing electrodes formed of a conductive material such as a metal for a touch sensing may be arranged on a substrate. However, when the touch sensor is inserted in the display device, an image quality implemented from the image display device may be degraded by the sensing electrodes. For example, the sensing electrodes may be visually recognized by the user to disturb the image. Further, a color sense of the image may be changed by the sensing electrodes.

Thus, construction of the sensing electrodes having improved optical properties for enhancing the image quality while maintaining desired conductivity and sensitivity for the touch sensing is required.

For example, as disclosed in Korean Patent Application Publication No. 2014-0092366, various image display devices combined with a touch screen panel including a touch sensor has been developed recently. However, the touch sensor or the touch panel having improved optical property is continuously demanded as described above.

SUMMARY

According to an aspect of the present invention, there is provided a touch sensor having improved optical property and electrical reliability.

According to an aspect of the present invention, there is provided an image display device including the touch sensor.

The above aspects of the present inventive concepts will be achieved by the following features or constructions:

(1) A touch sensor, including: a base layer; a first electrode layer including first dummy electrodes and first sensing electrodes arranged on a top surface of the base layer, the first sensing electrodes including first holes therein; an insulating interlayer formed on the base layer, the insulating interlayer covering the first electrode layer; and a second electrode layer including second dummy electrodes and second sensing electrodes arranged on a top surface of the insulating interlayer, the second sensing electrodes including second holes therein.

(2) The touch sensor according to the above (1), wherein each of the second holes is superimposed over each of the first dummy electrodes in a planar view.

(3) The touch sensor according to the above (1), wherein each of the second dummy electrodes is superimposed over each of the first holes in a planar view.

(4) The touch sensor according to the above (1), wherein the first dummy electrodes, the second dummy electrodes, the first holes and the second holes have the same shape and size.

(5) The touch sensor according to the above (1), wherein first spaces are defined between neighboring first dummy electrodes of the first dummy electrodes.

(6) The touch sensor according to the above (5), wherein each of the second sensing electrodes includes second unit patterns that are regularly repeated and integrally connected to each other, and each of the second unit patterns is superimposed over each of the first spaces in a planar view.

(7) The touch sensor according to the above (5), wherein the first spaces have a polygonal shape with opened vertices.

(8) The touch sensor according to the above (1), wherein second spaces are defined between neighboring second dummy electrodes of the second dummy electrodes.

(9) The touch sensor according to the above (8), wherein each of the first sensing electrodes includes first unit patterns that are regularly repeated and integrally connected to each other, and each of the second spaces is superimposed over each of the first unit patterns in a planar view.

(10) The touch sensor according to the above (8), wherein the second spaces have a polygonal shape with opened vertices.

(11) The touch sensor according to the above (1), wherein the first electrode layer further includes first connecting portions for connecting neighboring first sensing electrodes of the first sensing electrodes along a row direction, and the second electrode layer further includes second connecting portions for connecting neighboring second sensing electrodes of the second sensing electrodes in a column direction.

(12) The touch sensor according to the above (11), wherein the first holes are distributed throughout the first sensing electrodes and the first connecting portions, and the second holes are distributed throughout the second sensing electrodes and the second connecting portions.

(13) The touch sensor according to the above (1), wherein the first electrode layer and the second electrode layer each includes a transparent conductive oxide layer.

(14) The touch sensor according to the above (13), wherein the first electrode layer and the second electrode layer each has a multi-layered structure including the transparent conductive oxide layer and a metal layer.

(15) A window stack structure, including: a window substrate; and the touch sensor according to embodiments as described above stacked on the window substrate.

(16) An image display device, comprising: a display panel; and the touch sensor according to embodiments as described above stacked on the display panel.

In a touch sensor according to embodiments of the present invention, first sensing electrode and second sensing electrodes may be disposed at different levels from each other with an insulating layer interposed therebetween. Accordingly, a conventional bridge electrode may be omitted, thereby reducing an electrode recognition.

First and second holes may be formed in the first sensing electrodes and the second sensing electrodes, respectively, and dummy electrodes may be formed to fill the first and second holes in a planar view.

A difference in a refractive index and a reflectance in an overall stack structure may be reduced by the dummy electrodes, and a spatial frequency according to a pattern arrangement may be converted into a high frequency component. Accordingly, an electrode visual recognition in the touch sensor may be remarkably reduced.

Additionally, an overlap of electrode patterns may be reduced so that a sensing error and a sensitivity reduction due to a parasitic capacitance may be prevented.

DETAILED DESCRIPTION OF THE EMBODIMENTS

According to exemplary embodiments of the present invention, there is provided a touch sensor in which a first electrode layer and a second electrode layer may be disposed at different levels with an insulating layer interposed therebetween, and an electrode recognition and a parasitic capacitance may be prevented. Further, a window stack structure and an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, two directions that are parallel to a top surface of a touch sensor or a base layer 100 and cross each other are defined as a first direction and a second direction. For example, the first direction and the second direction may be perpendicular to each other.

The terms "first", "second", "row direction" and "column direction" used herein are used to relatively designate different elements and directions crossing each other, and not to indicate absolute order and directions.

Figure 1:
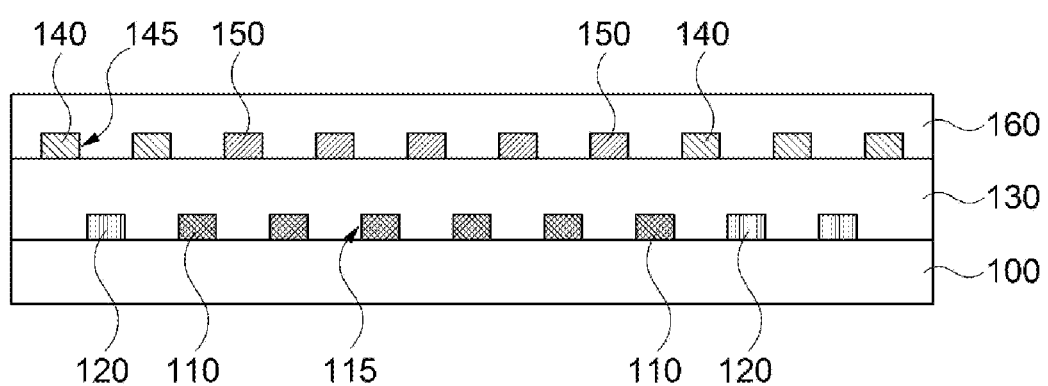
FIG. 1 is a schematic cross-sectional view illustrating a touch sensor in accordance with exemplary embodiments.

FIG. 1 is a schematic cross-sectional view illustrating a touch sensor in accordance with exemplary embodiments.

Referring to FIG. 1, the touch sensor may include a first electrode layer and a second electrode layer disposed on the base layer 100. The first electrode layer and the second electrode layer may be spaced apart from each other in a thickness direction with an insulating interlayer 130 interposed therebetween.

The base layer 100 may include a supporting layer or a film-type substrate for forming the electrode layers and the insulating interlayer 130. For example, the base layer 100 may include a film material commonly used in a touch sensor. For example, the base layer 100 may include glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate (polyallylate), polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

In some embodiments, a layer or a film member in an image display device to which the touch sensor is applied may also serve as the base layer 100. For example, an encapsulation layer or a passivation layer included in a display panel may serve as the base layer 100.

The first electrode layer may include first sensing electrodes 110 and first dummy electrodes 120. The first electrode layer may be formed on a top surface of the base layer 100. A first hole 115 may be formed at an inside of the first sensing electrode 110. Elements and structures of the first electrode layer will be described later in more detail with reference to FIGS. 2 to 4.

The insulating interlayer 130 may be formed on the top surface of the base layer 100 to cover the first electrode layer. The insulating interlayer 130 may include, e.g., an organic insulating material such as an epoxy-based resin, an acrylic resin, a siloxane-based resin, a polyimide-based resin, or an inorganic insulating material such as silicon oxide or silicon nitride.

The second electrode layer may include second sensing electrodes 140 and second dummy electrodes 150. A second hole 145 may be formed at an inside of the second sensing electrode 140. The second electrode layer may be formed on a top surface of the insulating interlayer 130. Elements and structures of the second electrode layer will be described later in more detail with reference to FIGS. 5 to 7.

In exemplary embodiments, the first electrode layer and the second electrode layer may each include a transparent conductive oxide. For example, the transparent conductive oxide may include indium tin oxide (ITO), indium zinc oxide (IZO), zinc oxide (ZnO), indium zinc tin oxide (IZTO), cadmium tin oxide (CTO), or the like. These may be used alone or in combination thereof.

In some embodiments, the first electrode layer and the second electrode layer may include a metal. For example, the first electrode layer and the second electrode layer may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least two thereof (e.g., silver-palladium-copper (APC) or copper-calcium (CuCa)).

In some embodiments, the first electrode layer and the second electrode layer may include a multi-layered structure including a transparent conductive oxide layer and a metal layer. For example, the first electrode layer and the second electrode layer may each have a double-layered structure of a transparent conductive oxide layer-metal layer or a triple-layered structure of a transparent conductive oxide layer-a metal layer-transparent conductive oxide layer. In this case, a flexible property may be enhanced by the metal layer and a resistance may be reduced so that a signal transfer speed may be also improved. Further, a resistance to corrosion and a transparency may be enhanced by the transparent conductive oxide layer.

A passivation layer 160 covering the second electrode layer may be formed on the insulating interlayer 130. The passivation layer may include an organic insulating material such as an epoxy-based resin, an acrylic resin, a siloxane-based resin, a polyimide-based resin, etc., or an inorganic insulating material such as silicon oxide or silicon nitride.

Figure 2:
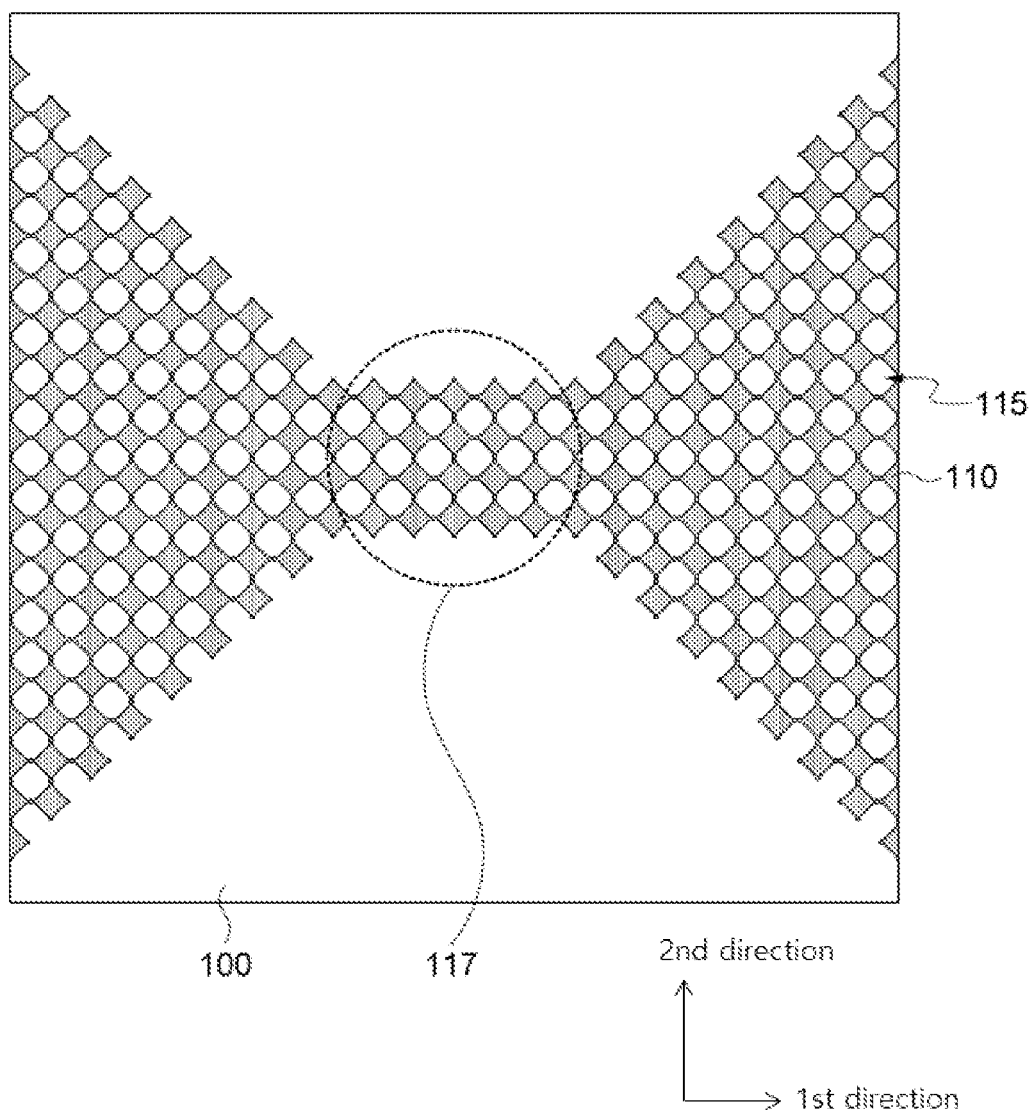
FIGS. 2 to 4 are schematic top planar views illustrating a construction of a first electrode layer of a touch sensor in accordance with exemplary embodiments.
Figure 3:
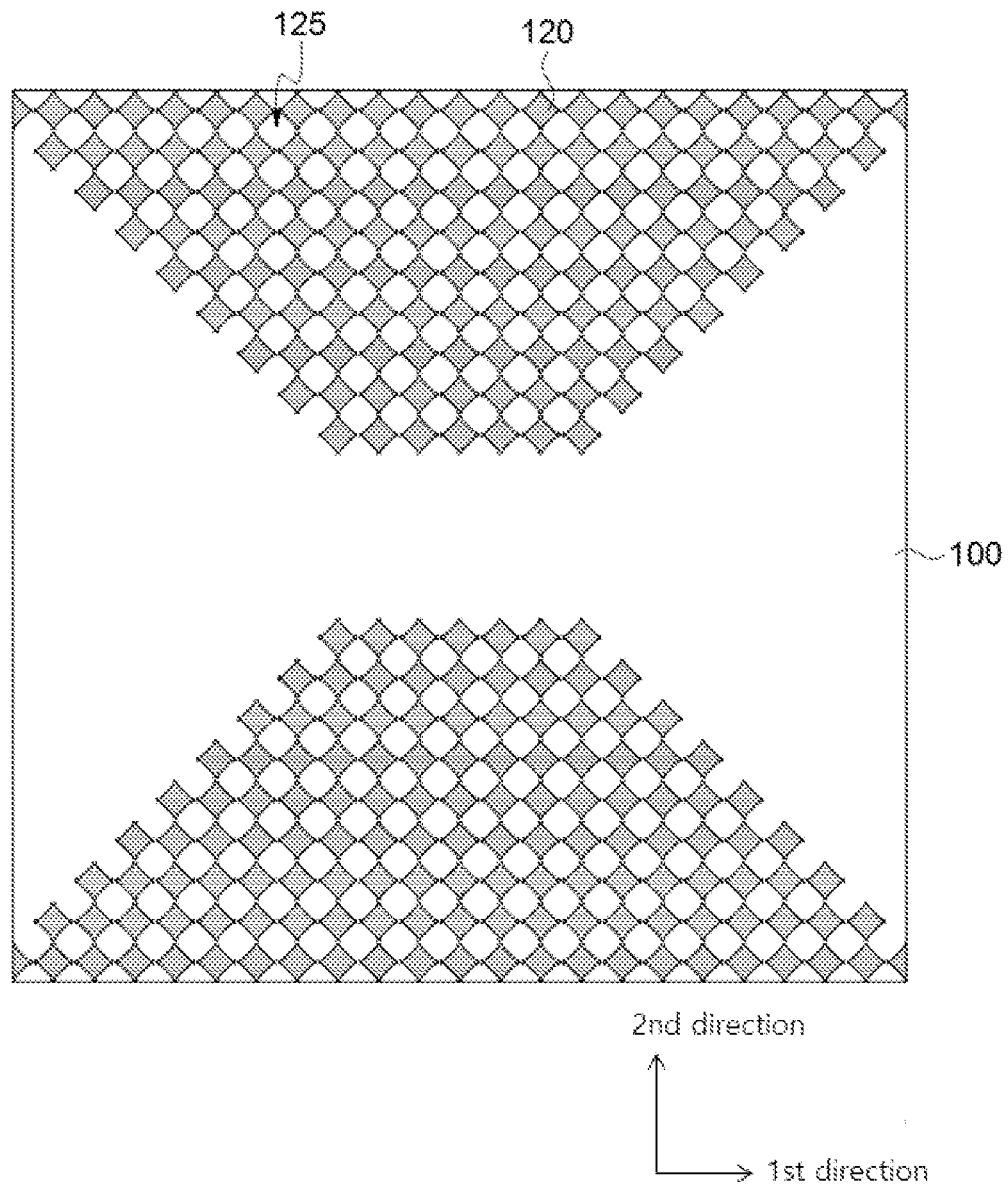
Figure 4:
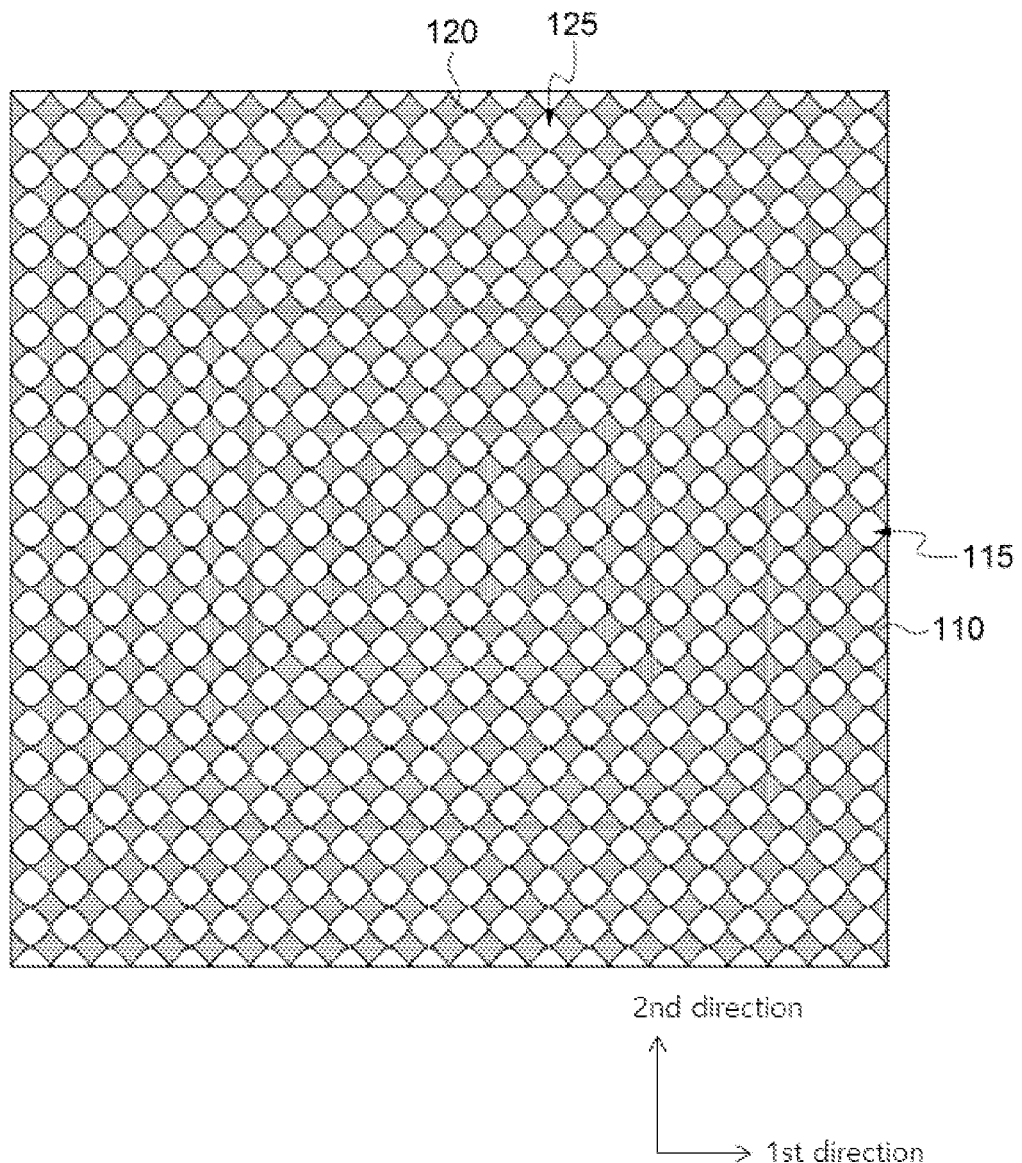

FIGS. 2 to 4 are schematic top planar views illustrating a construction of a first electrode layer of a touch sensor in accordance with exemplary embodiments. Specifically, FIG. 2 is an individual top planar view of a first sensing electrode 110. FIG. 3 is an individual top planar view of a first dummy electrode 120. FIG. 4 is a top planar view illustrating the first sensing electrode 110 and the first dummy electrode 120 together.

Referring to FIG. 2, the first sensing electrode 110 may have a polygonal pattern shape such as a rhombus shape. In exemplary embodiments, a plurality of the first sensing electrodes 110 may be arranged along a first direction (e.g., an X-direction or a row direction). The first sensing electrodes 110 neighboring in the first direction may be physically and electrically connected by a first connecting portion 117.

For example, a plurality of the first sensing electrodes 110 may be integrally connected to each other by the first connecting portions 117 to form a first sensing channel row extending in the first direction. A plurality of the first sensing channel rows may be arranged along a second direction (e.g., a Y-direction or a column direction). The first connecting portion 117 may be regarded substantially as a single member with the first sensing electrode 110.

In exemplary embodiments, the first holes 115 may be formed in the first sensing electrode 110. Each of the first holes 115 may substantially have a polygonal shape such as a rhombus shape.

The first holes 115 may be formed regularly (e.g., with a predetermined interval and in a predetermined shape) over an entire area of the first sensing electrode 110. The first holes 115 may also be formed in the first connecting portion 117.

The first holes 115 may penetrate through the first sensing electrode 110 and the first connecting portion 117. For example, the top surface of the base layer 100 may be exposed through the first holes 115.

The first holes 115 may be regularly and repeatedly formed in the first sensing electrode 110, so that the first sensing electrode 110 may have a shape including first unit patterns that may have a polygonal shape such as a rhombus shape and may be integrally connected with each other.

Referring to FIG. 3, the first dummy electrodes 120 may be arranged on the base layer 100.

In exemplary embodiments, the first dummy electrodes 120 may be arranged on a portion of the top surface of the base layer 100 on which the first sensing electrode 110 and the first connecting portion 117 are not formed when viewed in a planar direction. The first dummy electrodes 120 may be arranged around the first sensing electrode 110 and the first connecting portion 117, and may be spaced apart from the first sensing electrode 110 and the first connecting portion 117.

Each of the first dummy electrodes 120 may have a separate floating pattern or an island pattern shape. For example, each of the first dummy electrodes 120 may have a polygonal shape such as a rhombus shape.

Figure 5:
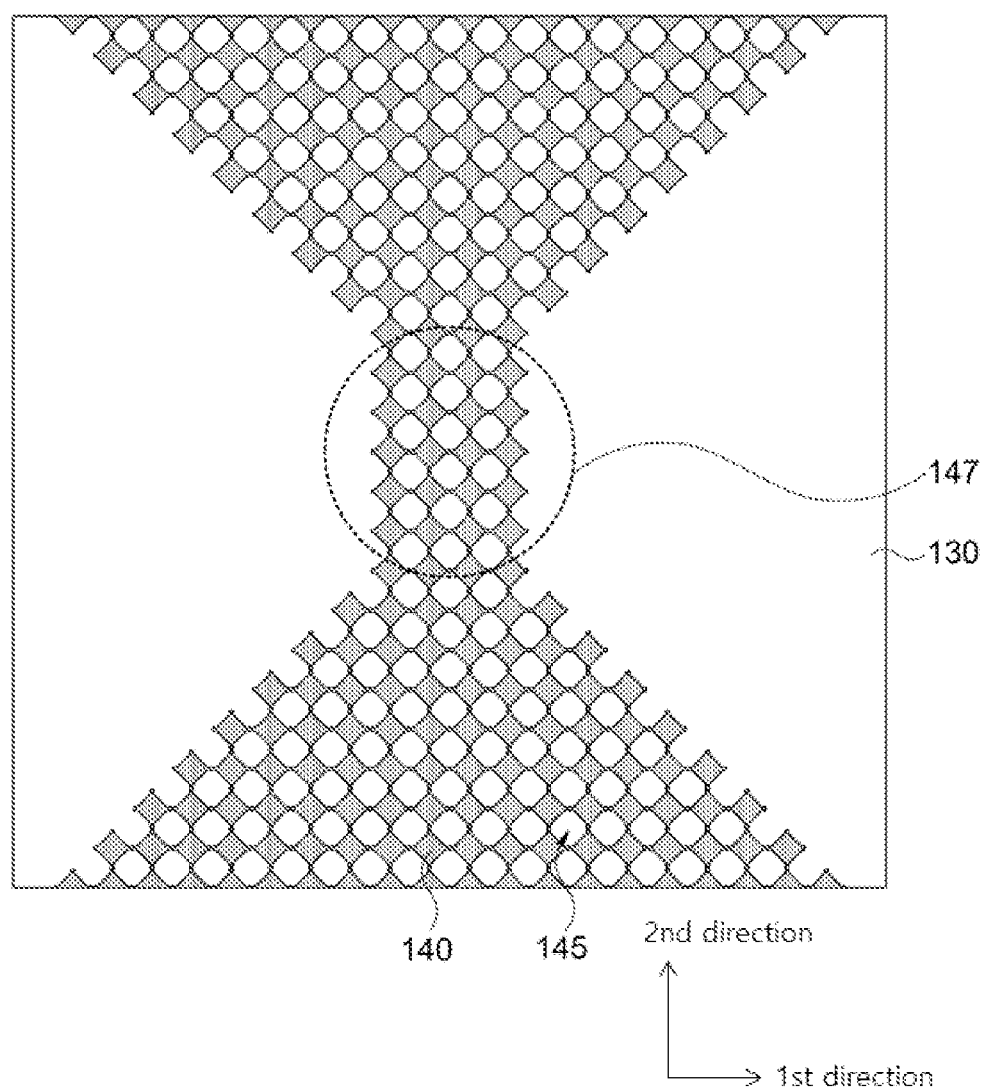
FIGS. 5 to 7 are schematic top planar views illustrating a construction of a second electrode layer of a touch sensor in accordance with exemplary embodiments.

In some embodiments, each of the first dummy electrodes 120 may have a shape substantially the same as or similar to that of a second hole 145 (see FIG. 5). The first dummy electrode 120 may also have a shape substantially the same as or similar to that of the first hole 115.

First spaces 125 may be defined between neighboring first dummy electrodes 120. For example, the first space 125 may be defined between four neighboring first dummy electrodes 120.

As illustrated in FIG. 3, the first space 125 may have a rhombus shape with an open vertex. The first space 125 may have a shape substantially the same as or similar to that of the first hole 115 and/or the second hole 145.

Referring to FIG. 4, as described above, the first electrode layer may include the first sensing electrodes 110 and the first dummy electrodes 120 arranged together on the top surface of the base layer 100.

As illustrated in FIG. 4, the first dummy electrodes 120 may be adjacent to the first sensing electrode 110, and may be disposed around the first sensing electrode 110. Additionally, the first spaces 125 having a shape substantially the same as or similar to that of the first hole 115 may be repeatedly arranged between the first dummy electrodes 120.

Accordingly, a structure in which electrode patterns and holes/spaces are regularly repeated may be formed on the top surface of the base layer 100. For example, the top surface of the base layer 100 may become uniform by a spatial frequency arrangement structure including high frequency components entirely by the electrode patterns and holes/spaces.

Figure 6:
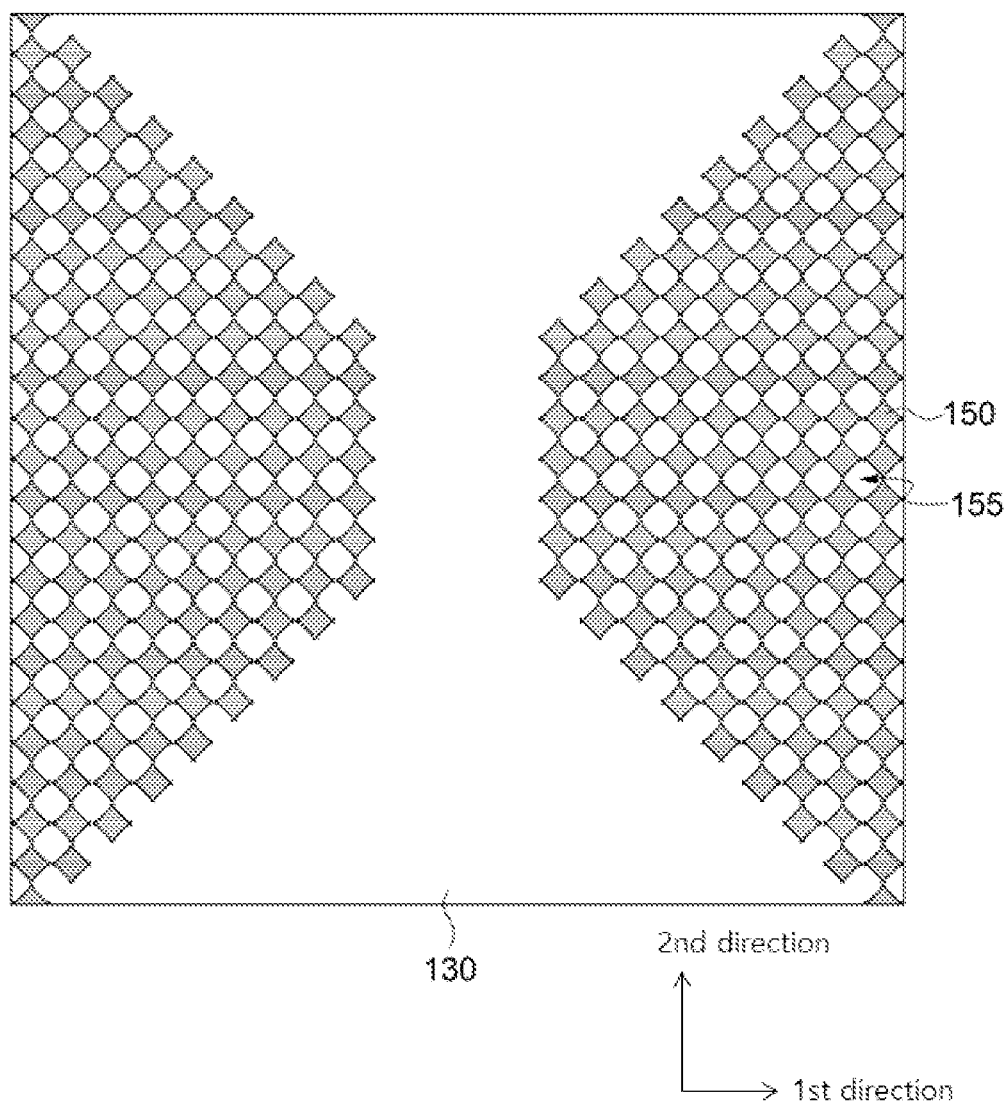
Figure 7:
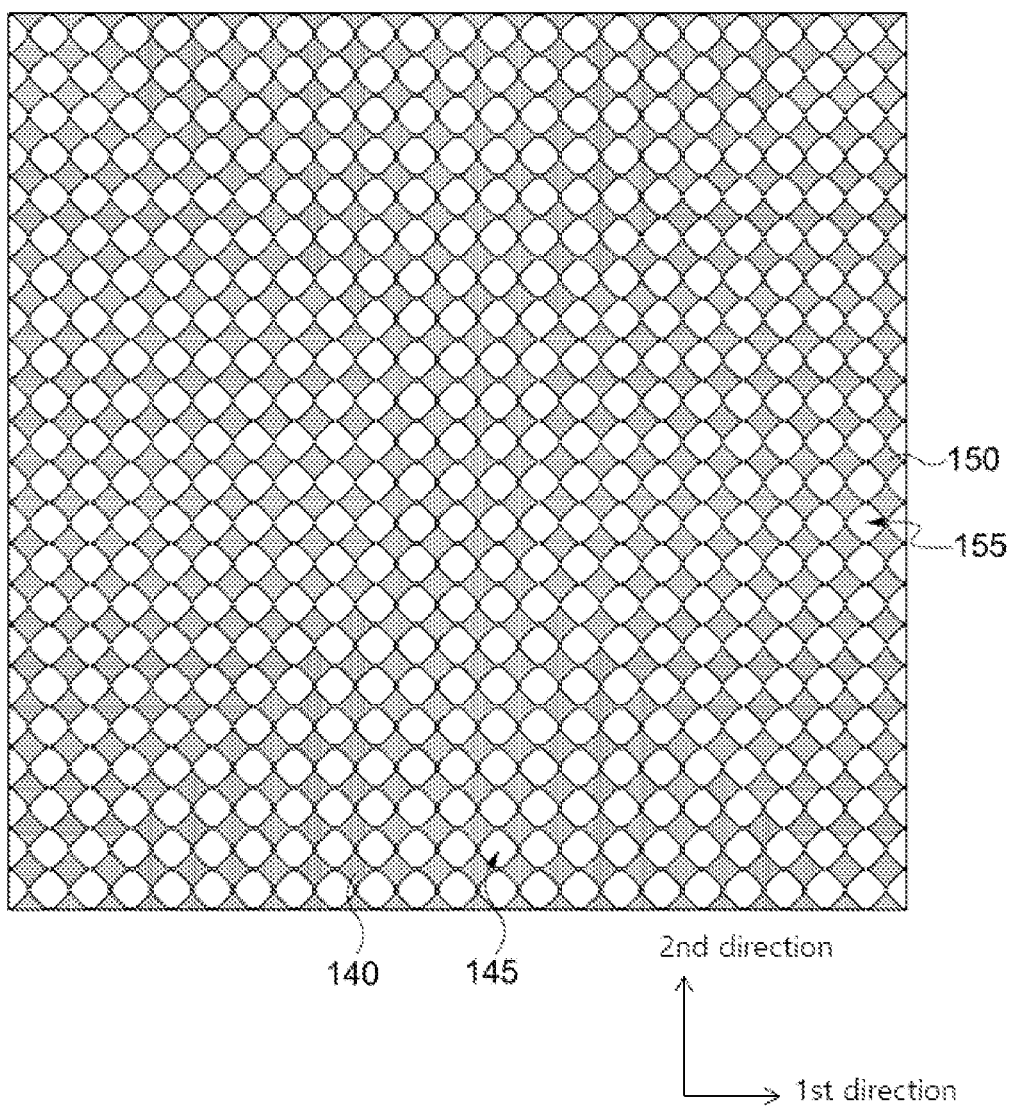

FIGS. 5 to 7 are schematic top planar views illustrating a construction of a second electrode layer of a touch sensor in accordance with exemplary embodiments. Specifically, FIG. 5 is an individual top planar view of a second sensing electrode 140. FIG. 6 is an individual top planar view of a second dummy electrode 150. FIG. 7 is a top planar view illustrating the second sensing electrode 140 and the second dummy electrode 150 together.

Referring to FIG. 5, the second sensing electrode 140 may have a polygonal pattern shape such as a rhombus shape. In exemplary embodiments, a plurality of the second sensing electrodes 140 may be arranged along the second direction. The second sensing electrodes 140 neighboring in the second direction may be physically and electrically connected by a second connecting portion 147.

For example, a plurality of the second sensing electrodes 140 may be integrally connected to each other by the second connecting portions 147 to form a second sensing channel column extending in the second direction. A plurality of the second sensing channel columns may be arranged along the first direction. The second connecting portion 147 may be regarded substantially as a single member with the second sensing electrode 140.

In exemplary embodiments, second holes 145 may be formed in the second sensing electrode 140. Each of the second holes 145 may substantially have a polygonal shape such as a rhombus shape.

The second holes 145 may be formed regularly (e.g., with a predetermined interval and in a predetermined shape) over an entire area of the second sensing electrode 140. The second holes 145 may also be formed in the second connecting portion 147.

The second holes 145 may penetrate through the second sensing electrode 140 and the second connecting portion 147. For example, the top surface of the insulating interlayer 130 may be exposed through the second holes 115.

The second holes 145 may be regularly and repeatedly formed in the second sensing electrode 140, so that the second sensing electrode 140 may have a shape including second unit patterns that may have a polygonal shape such as a rhombus shape and may be integrally connected with each other.

In exemplary embodiments, the second holes 145 may have a shape and a size substantially the same as or similar to those of the first dummy electrode 120 of the first electrode layer. In some embodiments, the second hole 145 may also have a shape and a size substantially the same as or similar to those of the first hole 115.

Referring to FIG. 6, the second dummy electrodes 150 may be arranged on the insulating interlayer 130.

In exemplary embodiments, the second dummy electrodes 150 may be arranged on a portion of the top surface of the insulating interlayer 130 on which the second sensing electrode 140 and the second connecting portion 147 are not formed when viewed in a planar direction. The second dummy electrodes 150 may be arranged around the second sensing electrode 140 and the second connecting portion 147, and may be spaced apart from the second sensing electrode 140 and the second connecting portion 147.

Each of the second dummy electrodes 150 may have a separate floating pattern or an island pattern shape. For example, each of the second dummy electrodes 150 may have a polygonal shape such as a rhombus shape.

In some embodiments, each of the second dummy electrodes 150 may have a shape substantially the same as or similar to that of the first hole 115 included in the first sensing electrode 110. The second dummy electrode 150 may also have a shape substantially the same as or similar to that of the first dummy electrode 120.

Second spaces 155 may be defined between neighboring second dummy electrodes 150. For example, the second space 155 may be defined between four neighboring second dummy electrodes 150.

As illustrated in FIG. 6, the second space 155 may have a rhombus shape with an open vertex. The second space 155 may have a shape substantially the same as or similar to that of the first space 125, the first hole 115 and/or the second hole 145.

Referring to FIG. 7, as described above, the second electrode layer may include the second sensing electrodes 140 and the second dummy electrodes 150 arranged together on the top surface of the insulating interlayer 130.

As illustrated in FIG. 7, the second dummy electrodes 150 may be adjacent to the second sensing electrode 140, and may be disposed around the second sensing electrode 140. Additionally, the second spaces 155 having a shape substantially the same as or similar to that of the second hole 145 may be repeatedly arranged between the second dummy electrodes 150.

Accordingly, a structure in which electrode patterns and holes/spaces are regularly repeated may be formed on the top surface of the insulating interlayer 130.

For example, the top surface of the insulating interlayer 130 may become uniform by a spatial frequency arrangement structure including high frequency components entirely by the electrode patterns and holes/spaces.

Figure 8:
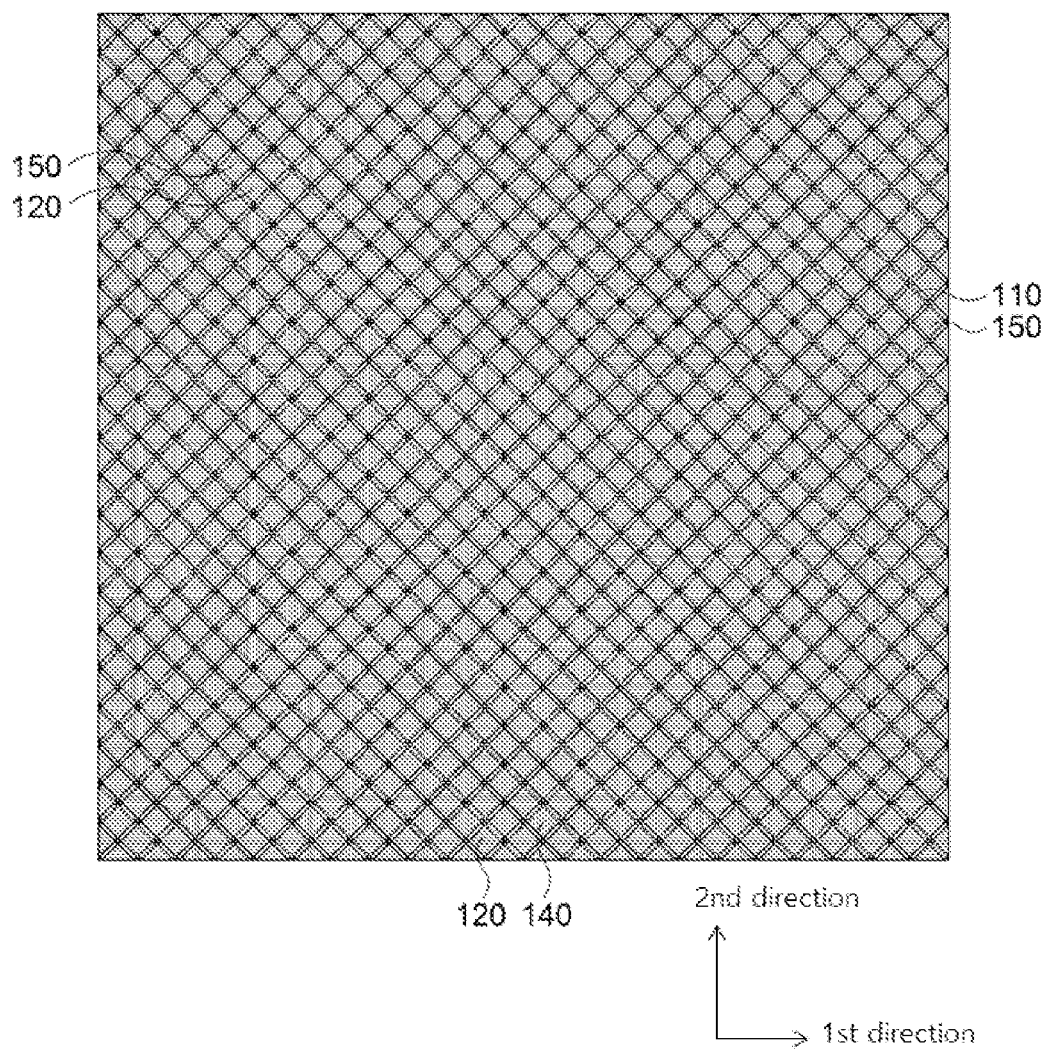
FIG. 8 is a schematic top planar view illustrating a construction of electrode layers of a touch sensor in accordance with exemplary embodiments.

FIG. 8 is a schematic top planar view illustrating a construction of electrode layers of a touch sensor in accordance with exemplary embodiments. Specifically, FIG. 8 is a planar view in which the first electrode layer of FIG. 4 and the second electrode layer of FIG. 7 are projected together from a planar direction.

Referring to FIG. 8, the second hole 145 included in the second sensing electrode 140 may be superimposed over the first dummy electrode 120 included in the first electrode layer in a planar view. In exemplary embodiments, the first dummy electrode 120 may be completely included in the second hole 145 in the planar view.

The second dummy electrode 150 included in the second electrode layer may be superimposed over the first hole 115 included in the first sensing electrode 110 in the planar view. In exemplary embodiments, the second dummy electrode 150 may be completely included in the first hole 115 in the planar view.

In some embodiments, the first space 125 formed between the first dummy electrodes 120 may be covered by the above-described second unit pattern included in the second sensing electrode 140 in the planar view. Further, the second space 155 formed between the second dummy electrodes 150 may be superimposed over the above-described first unit pattern included in the first sensing electrode 110 in the planar view.

According to the above-described exemplary embodiments, the first electrode layer and the second electrode layer may be disposed at different layers or at different levels with the insulating interlayer interposed therebetween. In a comparative example, when the first sensing electrodes and the second sensing electrodes are formed at the same layer, a bridge electrode is formed on an additionally separate layer to electrically connect the first sensing electrodes (or the second sensing electrodes) to each other. In this case, the bridge electrode may be visually recognized by a user due to reflection and refraction caused by the bridge electrode.

However, according to exemplary embodiments, the bridge electrode may be omitted so that the electrode visual recognition may be reduced.

Further, as illustrated in FIG. 8, the holes (spaces) and electrode patterns may be arranged to be superimposed with each other in the planar view. Thus, when observed from, e.g., a top surface of the touch sensor, a pattern irregularity may be substantially removed, and the top surface of the touch sensor may become uniform by high-frequency components that are not visually recognized by the user.

Additionally, a reflectance and a refractive index may become uniform or leveled entirely from the top surface of the touch sensor. Accordingly, the electrode visual recognition of the touch sensor may be substantially removed or reduced.

The holes (spaces) and the electrode patterns may be arranged to be superimposed with each other, so that a parasitic capacitance caused when the electrode patterns overlap in a thickness direction may also be suppressed. Thus, the parasitic capacitance may be sufficiently suppressed without increasing a thickness of the insulating interlayer 130, so that a thin-layered touch sensor may be implemented.

In FIGS. 2 to 8, the shapes of the holes (spaces) and the dummy electrodes are illustrated as a rhombus shape, but are not limited thereto, and may be properly changed into various shapes including other polygonal shapes such as a hexagonal shape, a circular shape, etc.

Figure 9:
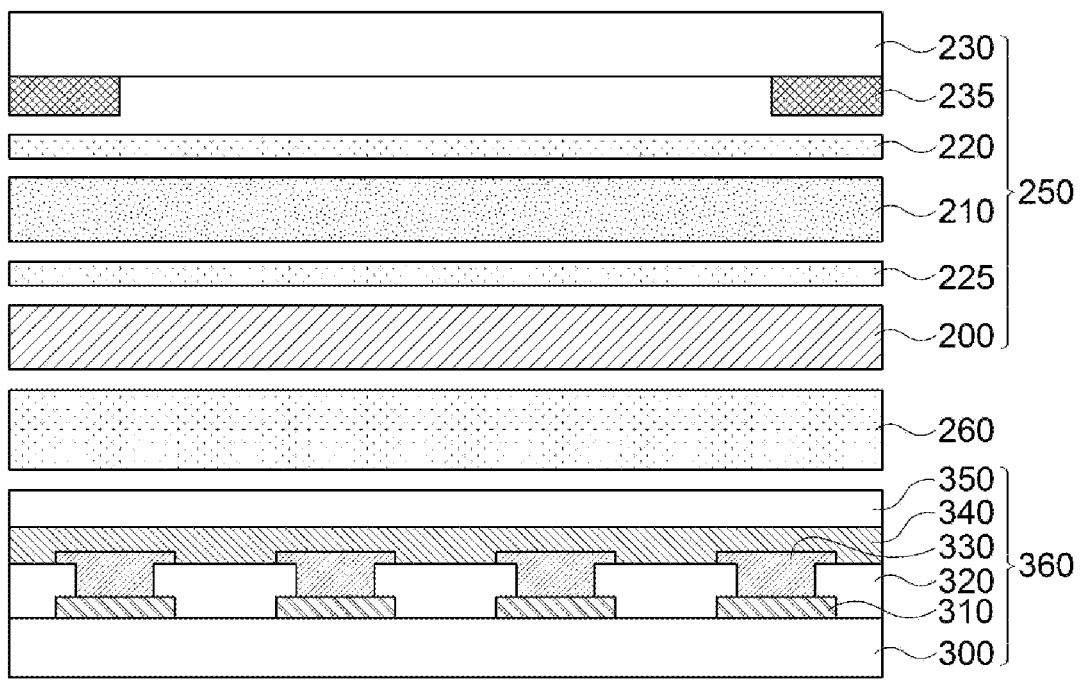
FIG. 9 is a schematic cross-sectional view illustrating a window stack structure and an image display device in accordance with exemplary embodiments.

FIG. 9 is a schematic cross-sectional view illustrating a window stack structure and an image display device in accordance with exemplary embodiments.

Referring to FIG. 9, a window stack structure 250 may include a window substrate 230, a polarizing layer 210 and a touch sensor 200 according to exemplary embodiments as described above.

The window substrate 230 may include, e.g., a hard coating film. In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may be included in the window stack structure 250 as a film or a panel. In an embodiment, the touch sensor 200 may be combined with the polarizing layer 210 via a second adhesive layer 225.

As illustrated in FIG. 9, the window substrate 230, the polarizing layer 210 and the touch sensor 200 may be sequentially positioned from a viewer's side. In this case, the electrode layer of the touch sensor 200 may be disposed under the polarizing layer 210 so that electrode patterns may be effectively prevented from being recognized by the viewer.

If the touch sensor 200 includes a substrate, the substrate may include, e.g., triacetyl cellulose, cycloolefin, cycloolefin copolymer, polynorbornene copolymer, or the like, and preferably, may have an in-plane retardation value of ±2.5 nm or less.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

The touch sensor 200 may include a construction of the holes (spaces) and the electrode patterns according to exemplary embodiments as described above, so that improved touch sensitivity may be implemented while preventing a degradation of an image quality from the display panel 360.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A touch sensor, comprising:
    a base layer;
    a first electrode layer comprising first dummy electrodes and first sensing electrodes arranged on a top surface of the base layer, the first sensing electrodes including first holes therein;
    an insulating interlayer formed on the base layer, the insulating interlayer covering the first electrode layer; and
    a second electrode layer comprising second dummy electrodes and second sensing electrodes arranged on a top surface of the insulating interlayer, the second sensing electrodes including second holes therein,
    wherein the first holes and the second holes have the same shape and size, and the first dummy electrodes and the second dummy electrodes have the same shape and size;
    each of the second holes is superimposed over each of the first dummy electrodes in a planar view; and
    each of second dummy electrodes is superimposed over each of the first holes in planar view.

2. The touch sensor of claim 1, wherein the first dummy electrodes, the second dummy electrodes, the first holes and the second holes have the same shape and size.

3. The touch sensor of claim 1, wherein first spaces are defined between neighboring first dummy electrodes of the first dummy electrodes.

4. The touch sensor of claim 3, wherein each of the second sensing electrodes includes second unit patterns that are regularly repeated and integrally connected to each other; and
    each of the second unit patterns is superimposed over each of the first spaces in a planar view.

5. The touch sensor of claim 3, wherein the first spaces have a polygonal shape with opened vertices.

6. The touch sensor of claim 1, wherein second spaces are defined between neighboring second dummy electrodes of the second dummy electrodes.

7. The touch sensor of claim 6, wherein each of the first sensing electrodes includes first unit patterns that are regularly repeated and integrally connected to each other; and each of the second spaces is superimposed over each of the first unit patterns in a planar view.

8. The touch sensor of claim 6, wherein the second spaces have a polygonal shape with opened vertices.

9. The touch sensor of claim 1, wherein the first electrode layer further comprises first connecting portions for connecting neighboring first sensing electrodes of the first sensing electrodes along a row direction; and the second electrode layer further comprises second connecting portions for connecting neighboring second sensing electrodes of the second sensing electrodes in a column direction.

10. The touch sensor of claim 9, wherein the first holes are distributed throughout the first sensing electrodes and the first connecting portions; and the second holes are distributed throughout the second sensing electrodes and the second connecting portions.

11. The touch sensor of claim 1, wherein the first electrode layer and the second electrode layer each includes a transparent conductive oxide layer.

12. The touch sensor of claim 11, wherein the first electrode layer and the second electrode layer each has a multi-layered structure including the transparent conductive oxide layer and a metal layer.

13. A window stack structure, comprising:

a window substrate; and the touch sensor of claim 1 stacked on the window substrate.

14. An image display device, comprising:

a display panel; and the touch sensor of claim 1 stacked on the display panel.

* * * * *